Dec. 5, 1939.         J. A. COXE         2,182,468
                   FISHING EQUIPMENT
          Original Filed March 2, 1935    2 Sheets-Sheet 1
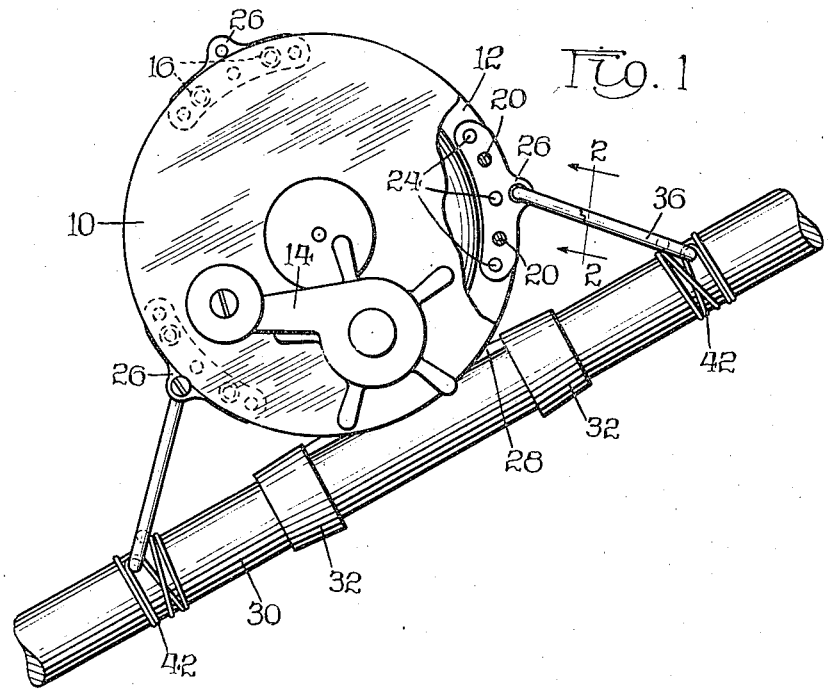
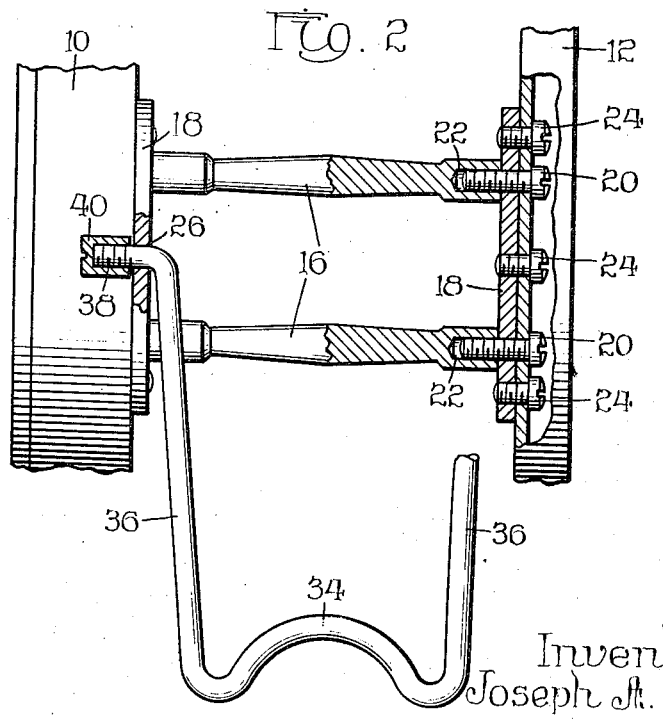
Inventor:
Joseph A. Coxe Dec. 5, 1939.    J. A. COXE    2,182,468
FISHING EQUIPMENT
Original Filed March 2, 1935    2 Sheets-Sheet 2
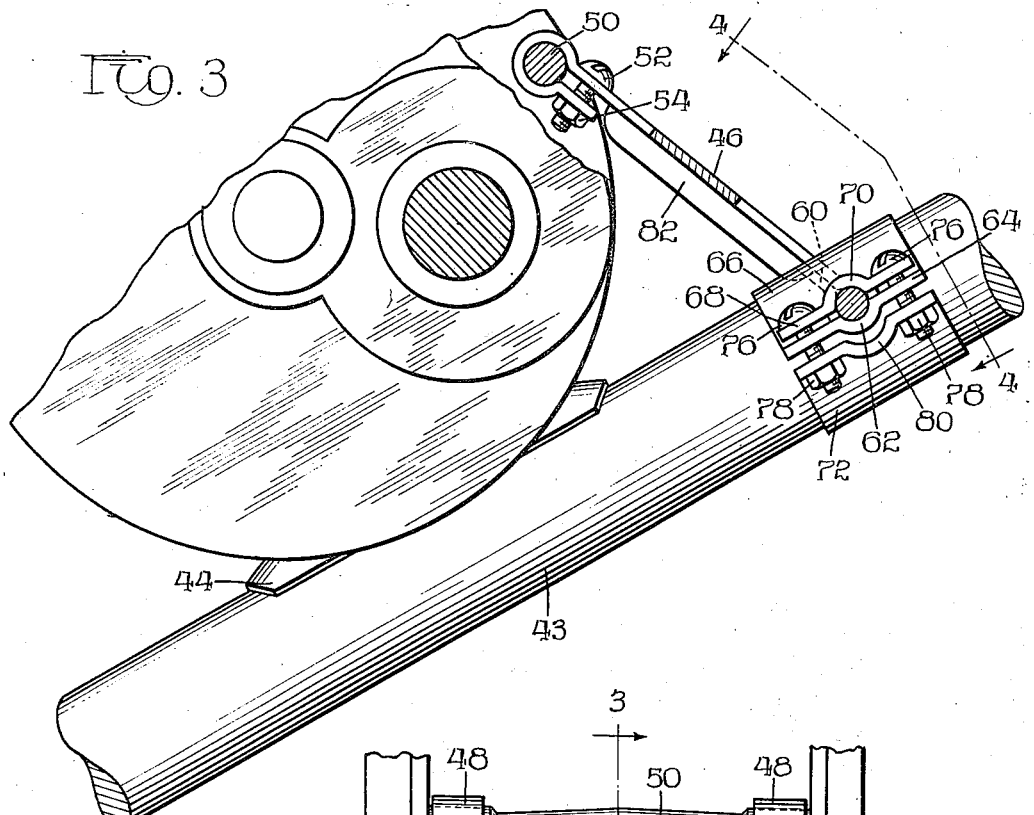
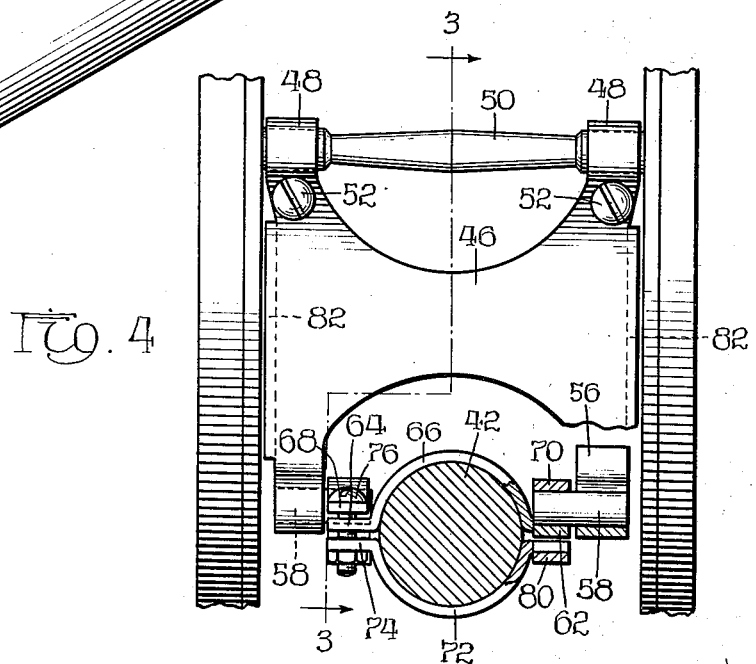
Inventor:
Joseph A. Coxe
By Freeman, Sweet, Albrecht & Weidman
Attys.

Patented Dec. 5, 1939

2,182,468

UNITED STATES PATENT OFFICE 2,182,468

FISHING EQUIPMENT

Joseph A. Coxe, Los Angeles, Calif., assignor to Bronson Reel Company, Bronson, Mich., a corporation of Michigan Original application March 2, 1935, Serial No. 9,032. Divided and this application July 18, 1936, Serial No. 91,288

5 Claims. (Cl. 242—84.1)

My invention relates to fishing equipment, and includes among its objects and advantages increased strength and rigidity in assembling a reel on a rod. This application is a division of my co-pending application Serial Number 9,032 filed March 2, 1935.

In the accompanying drawings:

Figure 1 is a side elevation of an assembly according to the invention;

Figure 2 is a section on line 2—2 of Figure 1;

Figure 3 is a section as on line 3—3 of Figure 4 of a modified construction; and Figure 4 is a section on line 4—4 of Figure 3.

In the embodiment of the invention selected for illustration, the reel comprises spaced end plates 10 and 12 and operating means for winding a line between them, including an operating crank 14. Six pillars 16 extend across between the end plates to unite them into a unitary rigid structure. These pillars are arranged in pairs, each pair being associated with a pair of end plates 18 to constitute a substantially rectangular subframe. Each end plate 18 is firmly bolted to the adjacent end plate by five machine screws. Two of these screws 20 are relatively long and pass through the end plate 12 and the sub-frame plate 18 into threaded openings 22 in the ends of the pillars. The other three screws 24 pass through the adjacent end plate and the sub-frame plate 18 only.

Each sub-frame plate has a centrally located ear 26 projecting radially outward and adapted to receive fastening and bracing means. The reel is provided with the usual clamping plate 28 arranged to cooperate with suitable clamping means on the rod 30 such as the clamping means indicated at 32. One of the sub-frames is directly opposite the rod plate 28, and the ears 26 of this sub-frame are utilized for the attachment of a suitable harness (not shown) engaging the shoulders of the user to enable the user to throw the entire weight of his body into the handling of the equipment. The other two sub-frames are connected to diagonal braces running down to the rod 30. In Figures 1 and 2, each diagonal brace comprises a central U-shaped portion 34 adapted to partially encircle the rod 30 and slightly diverging arms 36 extending up diagonally to enter the ears at 26. The outwardly extending ends 38 of the arms 36 are threaded, and caps 40 are firmly screwed down on them to complete the assembly of the brace with the reel. In use in fishing the bights 34 are lashed tightly to the rod with cord indicated at 42 in Figure 1. This distributes the bending stresses in the material of which the rod is composed and materially reduces the concentration of such stress at the rod seat 28.

In Figure 3, the rod 43 and seat 44 may be identical with those of Figures 1 and 2, or of any suitable construction. The diagonal brace is a flat plate 46 having ears 48 at its upper corners which encircle the ends of the pillar 50 and are clamped in place as by bolts 52 and nuts 54.

Ears 56 at the lower corners of the plate are integrally united with pivot 58 as by bending the metal around the pivot pins and back in contact with itself as indicated at 60 in Figure 3, and then welding or brazing. The inner ends of the pivots 58 overlie central sockets 62 in the end flanges 64 of the upper half 66 of the cylindrical rod clamp, and may be clamped in place by clamping plates 68 having sockets 70 complementary to the socket 62. The lower half 72 of the rod clamp has cooperating flanges 74, and the fastening bolts 76 pass through the plate 68, the flanges 64, and the flanges 74, and are drawn tight by means of nuts 78. The flanges 74 have central depressions at 80 to provide clearance for downward movement of the socket 62 when the parts are assembled.

The plate 46 is stiffened by side flanges 82 turned down at opposite sides. The companion brace at the other side of the reel of Figure 3 has not been illustrated as its construction is identical with the brace shown in that figure.

Without further elaboration the foregoing will so fully explain my invention that others may, by applying knowledge current at the time of application, readily adapt the same for use under various conditions of service.

I claim:

1. A rod brace for fishing reels comprising, in combination: a brace body; ears at the corners of one end of said body to encircle a reel pillar; ears at the other end of said body; a rod clamp; and connections for clamping said clamp to said last mentioned ears and to said rod.

2. In a fishing reel, in combination: spaced stationary head and tail end members; pillars extending across between said members and connected at their ends to the peripheral portions of said end members; a rod seat plate also connected to both end members; and a rod brace including spaced arms, each pivoted at one end to the periphery of one end member remote from said seat plate, and extending downwardly and outwardly away from said end member, and a bight joining the remote ends of said arms, and shaped to engage a rod; one of said pillars having its ends closely adjacent the pivots for said arms.

3. In fishing tackle, in combination: a reel having spaced end plates; pairs of spaced pillars and cross pieces between the pillars of each pair uniting said pairs of pillars into bracing frames; one of said frames being located in front of and below the reel axis; another of said frames being located behind and below the reel axis; and braces pivoted to the cross pieces of said frames and adapted to extend diagonally downward into engagement with a supporting rod for said reel.

4. The combination of claim 3 in combination with a one piece rod extending across below said reel and beyond its points of contact with both said braces.

5. In fishing tackle, in combination: a reel having a frame; a rod extending continuously past said frame in both directions; and attaching means for attaching and bracing said frame and rod to each other at three spaced places of attachment; said attaching means including a plate fastened to said reel frame and shaped to lie against said rod where it is nearest said frame; and diagonal braces extending from said frame and engaging said rod at points equally spaced from said plate, said braces including concave contact means at their outer ends shaped to fit said rod; said braces being pivoted to said frame so that they can carry tension or compression but no bending load.

JOSEPH A. COXE.